United States Patent
Hitomi et al.

(10) Patent No.: US 10,853,390 B2
(45) Date of Patent: Dec. 1, 2020

(54) INFORMATION PROCESSING DEVICE

(71) Applicant: FANUC CORPORATION, Yamanashi (JP)

(72) Inventors: Ryuuta Hitomi, Yamanashi (JP); Shinya Nakamura, Yamanashi (JP); Hideaki Maeda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 126 days.

(21) Appl. No.: 15/794,268

(22) Filed: Oct. 26, 2017

(65) Prior Publication Data

US 2018/0121534 A1 May 3, 2018

(30) Foreign Application Priority Data

Oct. 28, 2016 (JP) .................................. 2016-212242

(51) Int. Cl.
*G06F 16/00* (2019.01)
*G06F 16/28* (2019.01)
(Continued)

(52) U.S. Cl.
CPC ....... *G06F 16/285* (2019.01); *G05B 19/4093* (2013.01); *G06F 16/219* (2019.01); *G05B 2219/36513* (2013.01); *Y02P 90/265* (2015.11)

(58) Field of Classification Search
CPC .............. G05B 19/05; G05B 19/4093; G05B 2219/36513; G05B 19/409; G06F 16/219;
(Continued)

(56) References Cited

U.S. PATENT DOCUMENTS 7,707,283 B2 * 4/2010 Tsunoda ............. H04N 5/44543
                                                            709/224
9,147,434 B2 * 9/2015 Nishizawa ........... G11B 27/034
(Continued)

FOREIGN PATENT DOCUMENTS

JP          0580830 A      4/1993
JP          0584631 A      4/1993
(Continued)

OTHER PUBLICATIONS

Notification of Reasons for Refusal for Japanese Application No. 2016-212242, dated Mar. 13, 2017 with translation, 8 pages.
(Continued)

*Primary Examiner* — Jean M Corrielus
(74) *Attorney, Agent, or Firm* — RatnerPrestia

(57) ABSTRACT

An information processing device in accordance with the present invention provides assistance for displaying correct entry candidates depending on circumstances when entering a machining program. The information processing device includes a program collection unit configured to collect programs entered in numerical controllers, a program entry history storage unit configured to store the collected programs, a ranking information creation unit configured to create ranking information based on counting and scoring of the programs stored in the program entry history storage unit, a ranking information storage unit configured to store the ranking information created by the ranking information creation unit 11, and a ranking information distribution unit configured to distribute the ranking information stored in the ranking information storage unit to the numerical controllers.

7 Claims, 8 Drawing Sheets

(51) Int. Cl.
*G06F 16/21* (2019.01)
*G05B 19/4093* (2006.01)

(58) Field of Classification Search
CPC ............ G06F 16/285; G06F 17/30309; G06F 17/30598; Y02P 90/265
See application file for complete search history.

(56) References Cited

U.S. PATENT DOCUMENTS

| | | | |
|---|---|---|---|
| 9,268,847 B2* | 2/2016 | Shirai | G06F 3/0482 |
| 10,425,618 B2* | 9/2019 | Nishizawa | H04N 21/4316 |
| 10,444,738 B2* | 10/2019 | Hitomi | G05B 19/41835 |
| 2004/0133310 A1* | 7/2004 | Watanabe | G05B 19/41815 |
| | | | 700/245 |
| 2010/0217762 A1* | 8/2010 | Kajio | H04N 5/44543 |
| | | | 707/723 |
| 2014/0126884 A1* | 5/2014 | Nishizawa | G11B 27/105 |
| | | | 386/243 |
| 2014/0157149 A1* | 6/2014 | Nishizawa | H04N 21/4788 |
| | | | 715/752 |
| 2015/0205289 A1 | 7/2015 | Henning | |
| 2016/0282852 A1 | 9/2016 | Endou | |
| 2017/0178015 A1* | 6/2017 | Sato | G05B 19/4065 |
| 2017/0277174 A1* | 9/2017 | Maeda | G05B 19/41875 |
| 2017/0285614 A1 | 10/2017 | Kawai et al. | |
| 2018/0032058 A1* | 2/2018 | Mizuno | G05B 19/4097 |
| 2018/0373219 A1* | 12/2018 | Koga | G05B 19/4093 |

FOREIGN PATENT DOCUMENTS

| | | |
|---|---|---|
| JP | 10301615 A | 11/1998 |
| JP | 2000066711 A | 3/2000 |
| JP | 2009-110273 A | 5/2009 |
| JP | 2011028552 A | 2/2011 |
| JP | 2016188686 A | 10/2016 |
| WO | 2016051545 A1 | 4/2016 |

OTHER PUBLICATIONS

German Examination Report for German Application No. 10 2017 009 807.7, dated May 10, 2019, with translation—16 pages.

* cited by examiner

FIG.3

PROGRAM ENTRY HISTORY STORAGE UNIT 14

| IDENTIFICATION INFORMATION | PROGRAM | ENTRY DATE/TIME |
|---|---|---|
| A | ... | 2016/5/12 12:43:11 |
| B | ... | 2016/5/12 12:48:53 |
| C | ... | 2016/5/12 13:14:22 |
| D | ... | 2016/5/13 08:38:44 |
| E | ... | 2016/5/13 09:03:55 |
| F | ... | 2016/5/13 19:01:00 |
| ... | ... | ... |

FIG.4

PROGRAM ENTRY HISTORY STORAGE UNIT 14

| IDENTIFICATION INFORMATION | PROGRAM | ENTRY DATE/TIME | ... |
|---|---|---|---|
| A | G01 F100 X0; | 2016/5/12 12:43:11 | |
| B | G0 Z0.0; | 2016/5/12 12:48:53 | |
| C | G01 F200 X100; | 2016/5/12 13:14:22 | |
| D | G49; | 2016/5/13 08:38:44 | |
| E | G01 X50 F150; | 2016/5/13 09:03:55 | |
| F | G0 Z100.0; | 2016/5/13 19:01:00 | |
| ⋮ | ⋮ | ⋮ | ⋮ |

↓ RANKING INFORMATION CREATION

RANKING INFORMATION

| RANKING | PROGRAM | SCORE (NUMBER OF ENTRIES) |
|---|---|---|
| 1 | G01 F100 X0; | 3 |
| 2 | G0 Z0.0; | 2 |
| 3 | G49; | 1 |

FIG.7

PROGRAM ENTRY HISTORY STORAGE UNIT 14

| IDENTIFICATION INFORMATION | PROGRAM | ENTRY DATE/TIME | USER | ... |
|---|---|---|---|---|
| A | G01 F100 X0; | 2016/5/12 12:43:11 | USER A | |
| B | G0 Z0.0; | 2016/5/12 12:48:53 | USER A | |
| C | G01 F200 X100; | 2016/5/12 13:14:22 | USER A | |
| D | G49; | 2016/5/13 08:38:44 | USER B | |
| E | G01 X50 F150; | 2016/5/13 09:03:55 | USER B | |
| F | G0 Z100.0; | 2016/5/13 19:01:00 | USER C | |
| ⋮ | ⋮ | ⋮ | ⋮ | ⋮ |

USER INFORMATION STORAGE UNIT 17

| USER NAME | SKILL/ EXPERIENCE |
|---|---|
| USER A | 3 YEARS OF SERVICE |
| USER B | 10 YEARS OF SERVICE |
| USER C | 25 YEARS OF SERVICE |

RANKING INFORMATION CREATION

RANKING INFORMATION

| RANK | PROGRAM | SCORE |
|---|---|---|
| 1 | G0 Z0.0; | 6 |
| 2 | G01 F100 X0; | 5 |
| 3 | G49; | 3 |

INFORMATION PROCESSING DEVICE

BACKGROUND OF THE INVENTION

1. Field of the Invention

The present invention relates to an information processing device, and in particular relates to an information processing device that reduces time and effort in creation of a program by providing predicted candidates at the time of input of the program.

2. Description of the Related Art

A user performs processing with a numerical controller by reading a program created prior to the processing from an external storage device or the like and executing the program. The user often inputs and executes a simple program (MDI program, etc.) for operating an input device such as an MDI unit to edit part of the machining program in accordance with the status of the processing and/or for moving tools or checking the operation of the tools in a preparatory stage before starting the processing or in an interval between processes. When the numerical controller is directly operated to input the machining program, the user will input to the numerical controller appropriate commands for operating a machine controlled by the numerical controller instructions, envisioning the specific operation the machine is expected to perform under the control of the numerical controller. Meanwhile, in some cases, the user may not be able to instantaneously bring to mind what kind of command should be entered.

Japanese Patent Application Laid-Open No. 2009-110273 may be mentioned by way of example as one of the state of the art techniques for assisting input of a program by a user. The document discloses a device for predicting and displaying entry candidates on the basis of a character that has been entered while a user is inputting a program to an NC editing device.

A user who inputs a program but cannot instantly know what command to enter may want to refer to programs entered by other users in the past. However, the device disclosed in the above Japanese Patent Application Laid-Open No. 2009-110273 stores the character strings entered by the user and selects the entry candidates on the basis of the stored character strings. This is the drawback of the above-described state of the art device, for it cannot use as its reference information the programs that are thought to have been entered by other users.

The device disclosed in the above Japanese Patent Application Laid-Open No. 2009-110273 has another drawback in that it also stores programs that have been erroneously entered, causing erroneous programs to be suggested as the candidates.

A further drawback of the same device lies in the fact that even when it is attempted to use the entries of the programs by other users in the past as the reference information, informative programs of highly skilled users may be hidden behind numerous programs of many unskilled or unexperienced users.

SUMMARY OF THE INVENTION

In view of the above, an object of the present invention is to provide an information processing device that facilitates display of correct candidates depending on circumstances to assist entry of a machining program.

In accordance with the present invention, in order to solve the above-identified problems, there is provided an information processing device that collects programs executed in numerical controllers connected to the information processing device via a network, creates ranking information associated with a number of entries of each block on the basis of the machining programs that have been collected, and provides the numerical controllers with the ranking information that has been created.

The information processing device in accordance with the present invention may be configured to check syntax of the collected programs to be used in creation of the ranking information on the basis of usage of the programs, only extract actually executable programs to create the ranking information. By virtue of this, it is made possible to provide only those entry candidates that are meaningful as commands, for programs whose syntax is not correct are not taken into account in the ranking information.

Also, the information processing device in accordance with the present invention may be configured to collect, along with the programs as such, information regarding the numerical controllers in which the programs have been entered, information regarding machines controlled by the numerical controllers, information regarding users who have entered the programs, and the like, carry out weighting in accordance with skills and/or experiences of the users on the basis of the collected pieces of information to create the ranking information, and/or create the ranking information for each manufacturer and each type of the numerical controllers and the machines. By virtue of this, it is made possible to ensure that programs entered by skilled and/or experienced users are preferentially displayed, and use the ranking information in accordance with the numerical controllers and machines used by the users for prediction of the entry candidates.

Thus, the information processing device in accordance with the present invention, which is connected to at least one numerical controller via a network, is characterized by the fact that it includes a program collection unit configured to collect programs entered in the at least one numerical controller, a program entry history storage unit configured to store the programs collected by the program collection unit, a ranking information creation unit configured to create ranking information, the ranking information being obtained by counting and scoring of the respective programs stored in the program entry history storage unit; a ranking information storage unit configured to store the ranking information created by the ranking information creation unit; and a ranking information distribution unit configured to distribute the ranking information stored in the ranking information storage unit to the at least one numerical controller.

The above-described information processing device in accordance with the present invention further includes a syntax check unit configured to check syntax of the programs collected by the program collection unit and store only the programs whose syntax is correct in the program entry history storage unit.

According to the above-described information processing device in accordance with the present invention, information regarding users having entered the programs is associated with the programs collected by the program collection unit, and the ranking information creation unit carries out weighting of the programs on the basis of the information regarding the users and carries out scoring of the programs with the weighting taken into account.

According to the above-described information processing device in accordance with the present invention, information regarding the numerical controllers in which the programs are entered is associated with the programs collected by the program collection unit, and the ranking information creation unit assigns classifications to the programs on the basis of the information regarding the numerical controllers and creates the ranking information for each classification.

The information processing device in accordance with the present invention, information regarding machines controlled by the numerical controllers to which the programs are input are associated with the programs collected by the program collection unit, and the ranking information creation unit assigns classifications to the programs on the basis of the information regarding the machines and creates the ranking information for each classification.

According to the information processing device in accordance with the present invention, the program entry history storage unit is configured to store only the programs within a predetermined period defined prior to storing of the programs.

According to the information processing device in accordance with the present invention, the ranking information creation unit carries out the counting of the programs within a predetermined period stored in the program entry history storage unit and carries out the scoring of the programs, wherein the predetermined period is defined prior to the counting and the scoring of the programs.

Since the present invention extracts programs from a plurality of machines, it is made possible to accurately extract highly reusable programs as the entry candidates, which in turn makes it possible for the users to enter their own programs using, as reference information, the programs that were entered in the past by other users. Also, checking of the syntax of the programs when they are collected ensures that only actually executable programs are suggested as the candidates. Further, it is made possible to preferentially display the highly reusable programs of skilled and/or experienced users as the entry candidates, and display the entry candidates in accordance with the machines in use.

BRIEF DESCRIPTION OF THE DRAWINGS

The foregoing and other objects and features of the present invention will become apparent from the following description of embodiments with reference to the accompanying drawings, in which:

FIG. 3 is a diagram illustrating an example of a program entry history storage unit of the present invention;

FIG. 4 is a diagram illustrating an example of ranking information creation in accordance with the first embodiment of the present invention;

FIG. 7 is a diagram illustrating an example of ranking information creation in accordance with the third embodiment of the present invention.

DETAILED DESCRIPTION OF THE PREFERRED EMBODIMENTS

Embodiments of the present invention will be described hereinbelow with reference to the drawings. The same or similar features as those of the related art will be described using the same reference signs.

Figure 1:
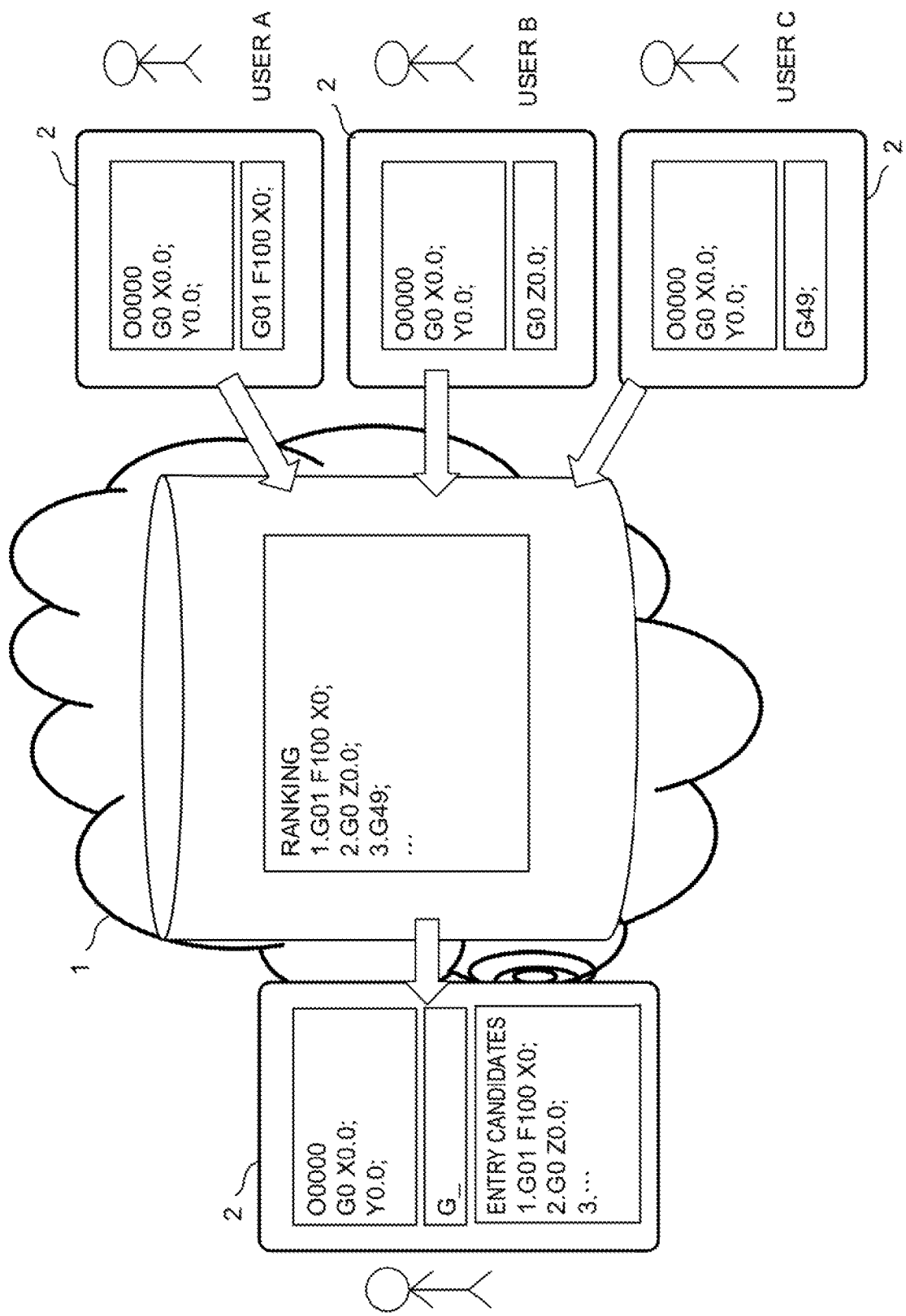
FIG. 1 is a diagram providing an overview of the present invention.

FIG. 1 is a diagram that provides an overview of the present invention. The information processing device 1 in accordance with the present invention is connected via a network to at least one or more numerical controllers 2. In addition, the information processing device 1 in accordance with the present invention collects the programs that have been entered in the respective numerical controllers 2, creates ranking information based on the programs that have been collected, and distributes the created ranking information to the numerical controllers 2. The numerical controllers 2 are allowed to display the entry candidates on the basis of the distributed ranking information when a user enters a program.

The information processing device 1 in accordance with the present invention may be configured, for example, by a host computer, a cell controller arranged in a manufacturing cell, a computer connected to the network, and the like. Also, one of the numerical controllers 2 may have the features necessary to function as the information processing device 1. In addition, the numerical controllers 2 may be a typical numerical controller, or a numerically controlled machine tool that combines and incorporates a numerical controller and a machining tool.

Figure 2:
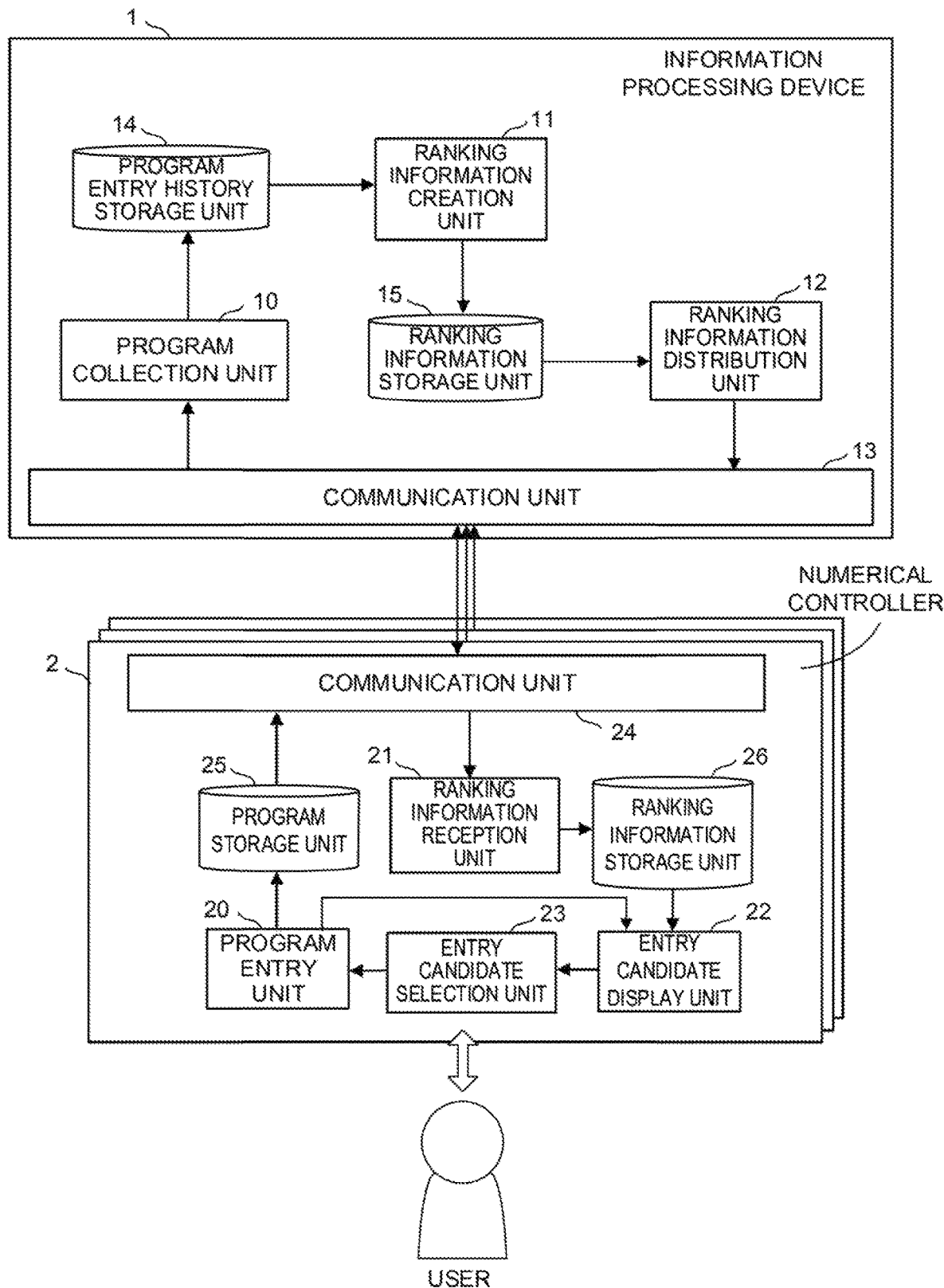
FIG. 2 is a functional block diagram of an information processing device and numerical controllers in accordance with a first embodiment of the present invention.

FIG. 2 is a functional block diagram of the information processing device 1 and the numerical controllers 2 in accordance with a first embodiment of the present invention. The information processing device 1 in accordance with this embodiment is connected to the numerical controllers 2 via the network. The information processing device 1 includes a program collection unit 10, a ranking information creation unit 11, a ranking information distribution unit 12, and a communication unit 13. The information processing device 1 further includes a program entry history storage unit 14 and a ranking information storage unit 15, which are provided in a not-shown memory unit of the information processing device 1.

The program collection unit 10 is a functional unit that is configured to collect, via the communication unit 13, programs that have been entered in the numerical controllers 2. The program collection unit 10 collects via the communication unit 13 the programs entered in the numerical controllers 2 by a user or users using the program entry unit 20, and stores the collected programs in the program entry history storage unit 14. The program collection unit 10 may be configured to acquire a program every time the program is entered in any one of the numerical controllers 2 (in other words, the numerical controllers 2 will autonomously transmit the programs to the information processing device 1) or to collect the programs at regular intervals from the numerical controllers 2. The program collection unit 10 may be configured to collect the programs from the respective numerical controllers 2 that are detected via the network, or collect the programs from the respective numerical controllers 2 that are stored as the targets to be controlled in a not-shown memory unit.

FIG. 3 is a diagram that illustrates an example of execution history information stored in the program entry history storage unit 14. A plurality of programs are stored in the program entry history storage unit 14. The programs stored in the program entry history storage unit 14 may be stored such that one single block is handled as one program (alternatively, a series of blocks may be handled as one program). The programs stored in the program entry history storage unit 14 may be associated with identification information that can uniquely identify the respective programs.

Also, the programs stored in the program entry history storage unit 14 may be stored along with time information indicative of the time points at which the programs were entered in the numerical controllers 2. Further, the programs may be stored in association with pieces of information such as types of machines on which the programs were run (machining center, lathe, complex machine, etc.), the manufacturers of the numerical controllers (NC devices) on which the programs were run, the names of the machines on which the programs were run, operators of the numerical controllers when the programs were run, etc. These pieces of information associated with the programs are acquired simultaneously with the collection of the programs by the program collection unit 10 from the numerical controllers 2.

The ranking information creation unit 11 is configured to refer to the program entry history storage unit 14, count the number of entries of the respective programs, assign scores to them (performs scoring), create ranking information on the basis of the result of the scoring, and store it in the ranking information storage unit 15. The ranking information creation unit 11 counts the programs with one block handled as one program. When a program that includes multiple blocks is stored in the program entry history storage unit 14, the ranking information creation unit 11 decomposes the program into the blocks and carries out the counting processing for each block. The ranking information creation unit 11 may be configured to create the ranking information every time the program collection unit 10 collects a program and stores it in the program entry history storage unit 14, or may be configured to create the ranking information at regular intervals.

The ranking information creation unit 11 may regard the blocks including the same commands and the addresses of the same type as one and the same program. Also, the ranking information creation unit 11 may regard addresses whose numerical values such as coordinate values change as one and the same address to perform the counting processing (for example, the program of "G00X100;" and the program of "G00X0;" may be regarded as one and the same program).

FIG. 4 is a diagram that illustrates an example of the process of counting by the ranking information creation unit 11. For simplicity, the following description is based on a case where the ranking information is created by the counting process based on the programs having pieces of the identification information of A to F, respectively, among the programs stored in the program entry history storage unit 14 illustrated in FIG. 4. The ranking information creation unit 11 refers to the programs having pieces of the identification information A to F, respectively, stored in the program entry history storage unit 14, regards the pieces of identification information of A, C, and E as having the same command and including the addresses of the same type (the addresses whose numerical values changes are regarded as the same ones) and accordingly regards them as one and the same program, and handles, for the purpose of the counting process, the program of "G01 F100 X0;" as having been entered three times. In the same manner, the ranking information creation unit 11 regards the programs having the pieces of the identification information of B and F, respectively, as one and the same program and handles the program "G0 Z0.0;" as having been entered twice for the purpose of the counting process. In this manner, the ranking information as illustrated in the lower section of FIG. 4 is created.

The ranking information creation unit 11 will actually perform the above-described process for all of the programs stored in the program entry history storage unit 14.

The ranking information distribution unit 12 distributes the ranking information, which is stored in the ranking information storage unit 15, via the communication units 13 and 24 to the numerical controllers 2. The ranking information distribution unit 12 may distribute by broadcast the ranking information via the network, or may distribute the ranking information to the numerical controllers 2 stored as the targets to be controlled in a not-shown memory unit. The distribution of the ranking information by the ranking information distribution unit 12 may take place when the ranking information is created by the ranking information creation unit 11 and stored in the ranking information storage unit 15 or may be performed at regular intervals.

The numerical controllers 2 in accordance with this embodiment are each connected to the information processing device 1 via the network. The numerical controllers 2 each include the program entry unit 20, a ranking information reception unit 21, an entry candidate display unit 22, an entry candidate selection unit 23, and the communication unit 24. In addition, the numerical controllers 2 each include a program storage unit 25 and a ranking information storage unit 26, which are provided in each of not-shown memory units of the numerical controllers 2.

The program entry unit 20 is a functional unit that is configured to monitor an entry status of a program entered by a user from a program input screen displayed in a not-shown MDI unit of the numerical controllers 2, and store the entered program in the program storage unit 25. The program entry unit 20 is configured to store the program that has been accepted in the program storage unit 25 in combination with information such as the entry time at which the program was entered. The program stored in the program storage unit 25 is transmitted, in response to a request from the program collection unit 10 or autonomously by the numerical controller 2, to the information processing device 1 via the communication unit 24.

The ranking information reception unit 21 is a functional unit that is configured to receive the ranking information distributed by the ranking information distribution unit 12 and stores it in the ranking information storage unit 26.

The entry candidate display unit 22 is a functional unit that is configured to predict, while the program entry unit 20 monitors the entry status of the program entered by the user via the program input screen, the program the user is attempting to enter on the basis of the entry status and the ranking information which is stored in the ranking information storage unit 26, and display the result of the prediction as entry candidates on the program input screen. The entry candidate display unit 22 uses a character string entered by the user monitored by the program entry unit 20 as the key and carries out forward search with regard to the individual programs included in the ranking information stored in the ranking information storage unit 26, and extracts a forward matching program or programs with respect to the character string that has been entered by the user along with the ranks of the programs in the ranking information. For example, when the ranking information illustrated in the lower section of FIG. 4 is distributed and stored in the ranking information storage unit 26 and the user has entered the character "G" in the program input screen, then the entry candidate display unit 22 extracts "G01 F100 X0;" "G0 Z0.0;" and "G01 F200 X100;" and displays the extracted ones according to the ranks they have in the ranking information on the program input screen. Also, when the user has entered the character string "G01" in the input screen, the entry candidate display unit 22 extracts "G01 F100 X0;" and "G01 F200 X100;" and displays them on the program input screen according to their ranks in the ranking information.

The entry candidate selection unit 23 is a functional unit that is configured to select one program from the input candidates displayed by the entry candidate display unit 22 on the basis of the input by the user, and automatically enter the selected program in the program input screen. The entry candidate selection unit 23 may be configured, for example, to select by a cursor the program displayed by the entry candidate display unit 22, or may be configured to select it by a pointing device such as a mouse and a touch panel.

As described in the foregoing, the information processing device 1 in accordance with the first embodiment creates the ranking information on the basis of the programs collected from the numerical controllers 2 and distributes the created ranking information to the numerical controllers 2, thereby assisting the entry of the program by the user. Since the ranking information is used that is based on the programs that have been entered in the numerical controllers 2, it is made possible for the users of the numerical controllers 2 to use the entries of the programs by other users as reference information to enter their own programs.

Figure 5:
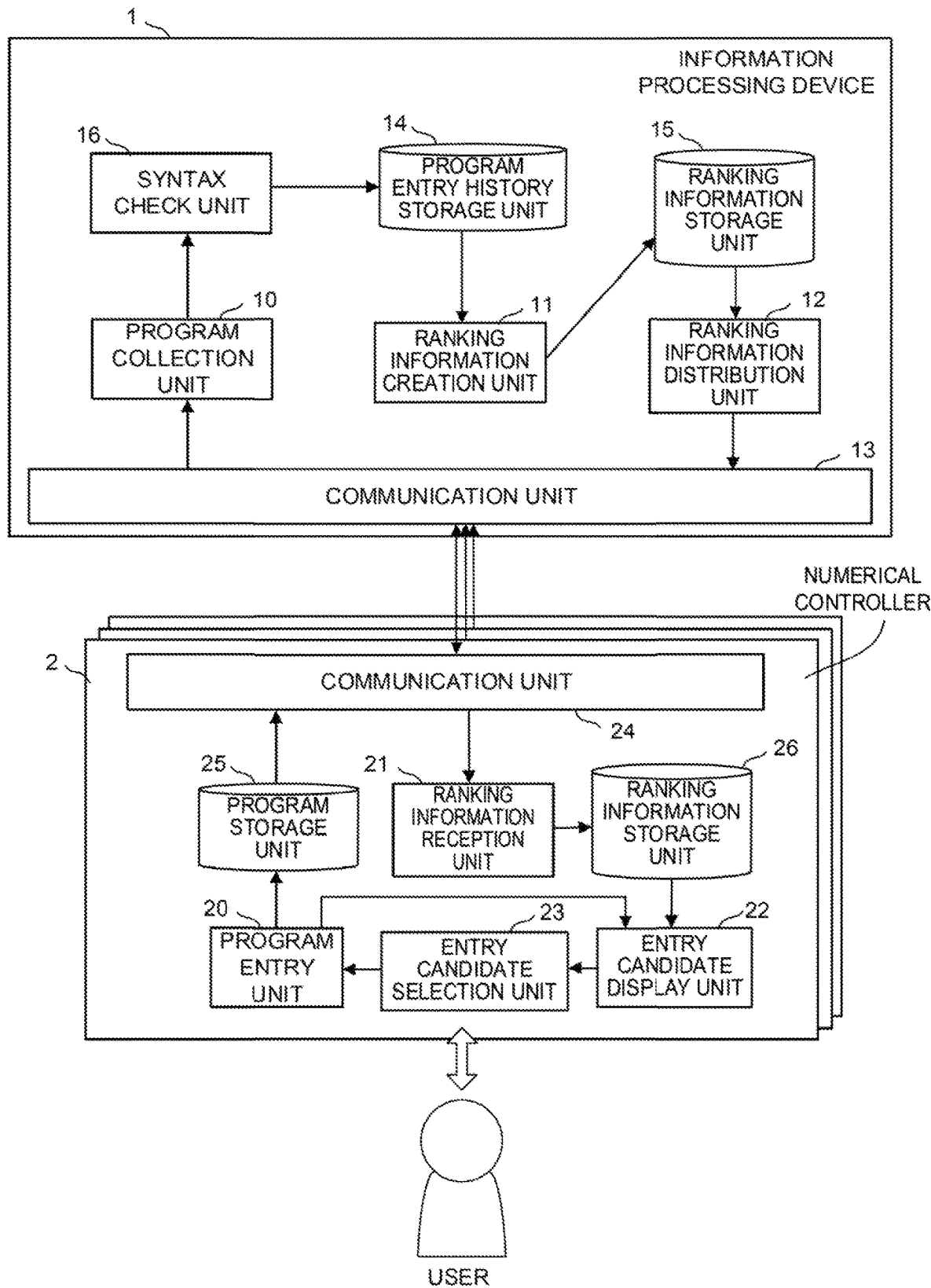
FIG. 5 is a functional block diagram of the information processing device and the numerical controllers in accordance with a second embodiment of the present invention.

FIG. 5 is a functional block diagram of the information processing device 1 and the numerical controller 2 in accordance with a second embodiment of the present invention. The information processing device 1 in accordance with this embodiment further includes a syntax check unit 16 in addition to the features of the information processing device 1 in accordance with the first embodiment.

The syntax check unit 16 checks the syntax of the programs collected from the numerical controllers 2 and, if the syntax of the programs is not correct, in other words, if the programs on an as-is basis cannot be meaningful as the command for the numerical controllers 2, prohibits the programs from being stored in the program entry history storage unit 14.

The operations of the other functional units are the same as those in the first embodiment.

As described in the foregoing, the information processing device 1 in accordance with the second embodiment checks the syntax of the programs when they are collected from the numerical controllers 2 and prohibits the programs whose syntax is not correct from being stored in the program entry history storage unit 14. As a result, it is made possible to store only the programs that can be used as commands for the numerical controller 2 in the program entry history storage unit 14, based on which the ranking information is created by the ranking information creation unit 11. Accordingly, the entry candidates displayed for the user are all used as the commands for the numerical controllers 2, which makes it possible to provide more effective program entry assistance. It should be noted that the syntax check unit may be provided on the side of the numerical controller 2.

Figure 6:
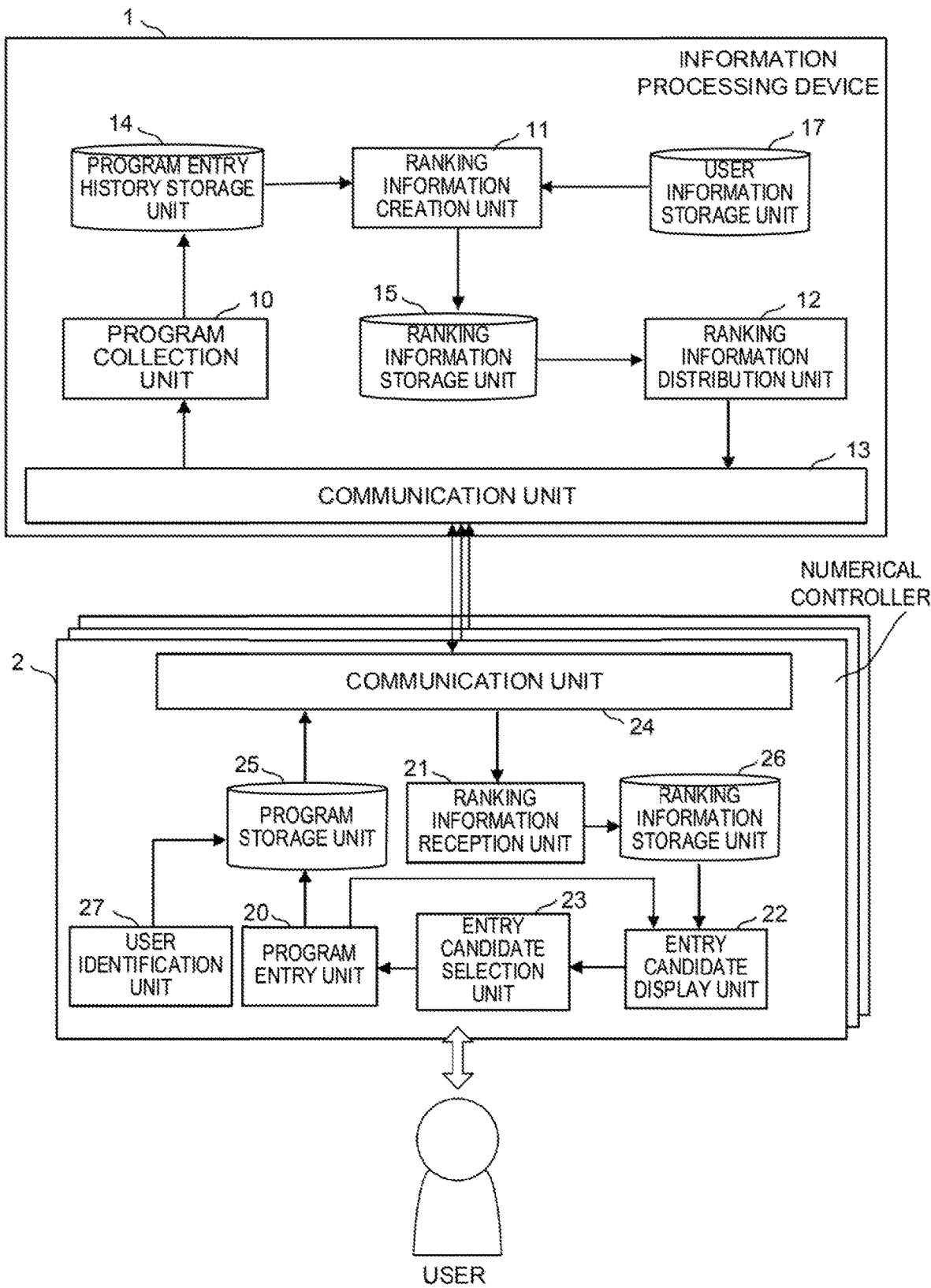
FIG. 6 is a functional block diagram of the information processing device and the numerical controllers in accordance with a third embodiment of the present invention.

FIG. 6 is a functional block diagram of the information processing device 1 and the numerical controller 2 in accordance with a third embodiment of the present invention. The information processing device 1 in accordance with this embodiment further includes a user information storage unit 17 in addition to the features of the information processing device 1 in accordance with the first embodiment. Also, the numerical controller 2 includes a user identification unit 27 configured to identify the user who is using this numerical controller 2.

The user identification unit 27 is a functional unit configured to identify the users of the numerical controllers 2. The user identification unit 27 may be configured to receive an identifier for identifying a user, the name of the user, and the like from a not-shown MDI unit of the numerical controller 2, and may also be configured to read the information for identifying the user from a USB memory device, an IC card, and the like carried by the user. The user identification unit 27 stores the information for identifying the user in the program storage unit 25 in combination with the program entered by the same user and received by the program entry unit 20.

The program collection unit 10 of the information processing device 1 in accordance with this embodiment collects the program and the information for identifying the user who entered the program when collecting the programs from the numerical controller 2, and stores them in the program entry history storage unit 14.

The ranking information creation unit 11 of the information processing device 1 in accordance with this embodiment refers, when creating the ranking information, to the user information storage unit 17, carries out a weighting process for the individual programs stored in the program entry history storage unit 14 in accordance with the users who entered the programs, counts, as the scores, the numerical values obtained as a result of the weighting process, and thereby creates the ranking information.

FIG. 7 is a diagram that illustrates an example of the counting process by the ranking information creation unit 11 in accordance with this embodiment. For simplicity, the following description is provided based on a case where the ranking information obtained by the counting process based on the programs with the pieces of the identification information of A to F, respectively, is created from among the programs stored in the program entry history storage unit 14 illustrated in FIG. 7. The ranking information creation unit 11 performs the weighting process based on the user information stored in the user information storage unit 17 for weighting of the programs with the pieces of the identification information of A to F, respectively, stored in the program entry history storage unit 14. For example, if the weighting process based on lengths of service should be performed, where the weight of the case where the length of service is 0 to 9 years is 1; the weight of the case where the length of service is 10 to 19 years is 3; and the weight of the case where the length of service is 20 to 30 years is 5, then the weight for the programs A to C, which has been entered by the user A, is 1; the weight for the programs D and E, which have been entered by the user B, is 3; and the weight for the program F, which has been entered by the user C, is 5. The ranking information creation unit 11 carries out the counting process on the basis of the programs that have been subjected to the weighting process, where the score of the program "G0 Z0.0;" is 6, the score of the program "G01 F100 X0;" is 5, and the score of the program "G49" is 3. In this manner, the ranking information as illustrated in the lower section of FIG. 7 is created.

The operations of the other functional units are the same as those in the first embodiment.

As described in the foregoing, the information processing device 1 in accordance with the third embodiment collects, when collecting programs from the numerical controllers 2, the information regarding the users who have entered the programs as well, and carries out the weighting process based on the user information and thus creates the ranking information. Accordingly, it is ensured that the programs entered by skilled and/or experienced users will preferentially occupy the higher ranks in the ranking, which makes it possible to create highly reliable ranking information and thereby provide more effective assistance for entry of programs.

Figure 8:
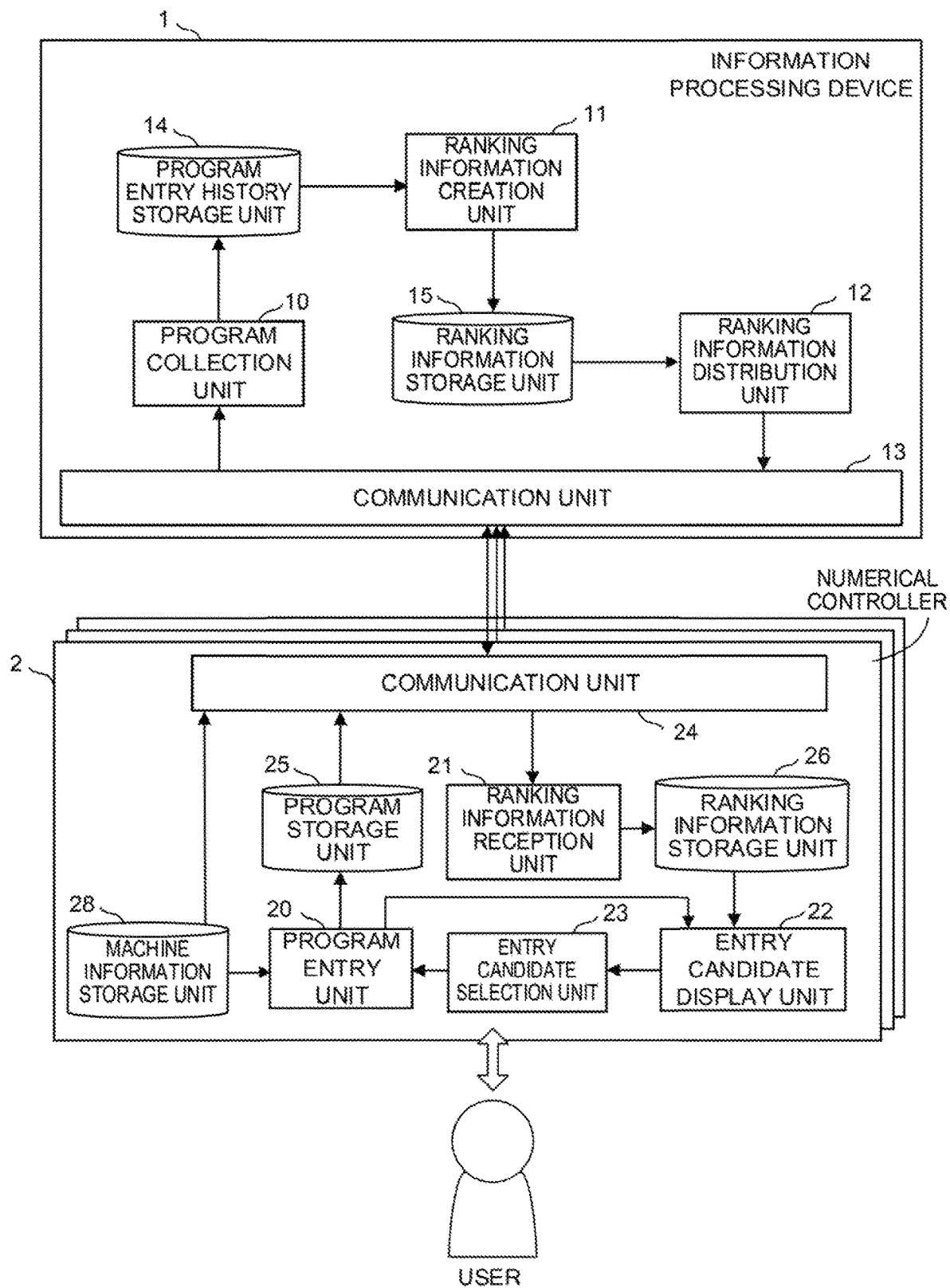
FIG. 8 is a functional block diagram of the information processing device and the numerical controller in accordance with a fourth embodiment of the present invention.

FIG. 8 is a functional block diagram of the information processing device 1 and the numerical controller 2 in accordance with a fourth embodiment of the present invention. The numerical controller 2 in accordance with this embodiment further includes a machine information storage unit 28 in addition to the features of the numerical controller 2 in accordance with the first embodiment.

The machine information storage unit 28 stores information regarding the numerical controller and the information regarding the machine controlled by the numerical controller 2. The program entry unit 20 of this embodiment stores, when storing the program received from the user in the program storage unit 25, the information regarding the numerical controller 2 and the information regarding the machines to be controlled which are stored in the machine information storage unit 28. The information regarding the numerical controller may include, for example, the name of the manufacturer of the numerical controller, the product number of the numerical controller, and the like. Also, the information regarding the machine to be controlled may include, for example, the name of the manufacturer of the machine, the type of the machine (machining center, lathe machine, etc.), the product number of the machine, and the like.

The program collection unit 10 of the information processing device 1 in accordance with this embodiment collects, when collecting the programs from the numerical controllers 2, the programs as such and the information regarding the numerical controller 2 and the information regarding the machine to be controlled stored in combination with the programs, and stores them in the program entry history storage unit 14.

The ranking information creation unit 11 of the information processing device 1 in accordance with this embodiment sorts, when creating the ranking information, the programs based on the manufacturers of the numerical controllers, the types of the numerical controllers 2, the types of the machines to be controlled, and the like, and counts the programs based on the classifications, and creates the ranking information for each of the classifications.

The ranking information distribution unit 12 in accordance with this embodiment refers, when distributing the ranking information stored in the ranking information storage unit 15, to the machine information storage unit 28 of the numerical controllers 2 that are the destinations of the distribution, and distributes the appropriate ranking information of the classifications that conform to numerical controllers 2 in accordance with the manufacturers of the numerical controllers 2, the types of the numerical controllers 2, the types of the machines to be controlled by the numerical controllers 2, and the like.

The operations of the other functional units are the same as those in the first embodiment.

As described in the foregoing, the information processing device 1 in accordance with the fourth embodiment distributes, to the numerical controllers 2, the ranking information conforming to the individual numerical controllers 2, so that it is made possible to provide assistance for entry of programs more appropriate in view of the states of the processing.

Whilst the embodiments of the present invention have been described in the foregoing, the present invention is not limited to the example of embodiments described above, and may be implemented in various modes with modifications made as appropriate.

For example, although the ranking information in accordance with the above-described embodiments is created based on the programs stored in the program entry history storage unit 14, use of the histories of entry of all of these programs may cause a program frequently used in the past but now used only occasionally to occupy a higher rank, undermining the usefulness of the ranking information. In view of this, the program entry history storage unit 14 may be configured to store histories of the programs that were entered within a predetermined period and delete old histories, and the ranking information creation unit 11 may be configured to only use the histories of the programs entered within a predetermined period and create the ranking information so as to avoid such a situation.

Also, the respective functional units introduced in the above-described embodiments may be combined as appropriate to form one embodiment.

The invention claimed is:

1. A machining system comprising:
an information processing device including a processor; and
a plurality of numerical controllers for controlling a machining tool, the plurality of numerical controllers including a processor;
wherein the information processing device is connected to the plurality of numerical controllers via networks,
the processor of the information processing device is configured to:
collect programs entered in the plurality of numerical controllers, the programs each including a command and an address for controlling the machine tool;
count a number of the programs entered in the numerical controller based on the collected programs and create ranking information by scoring the program, the ranking information being obtained based on a counting result;
distribute the ranking information to the plurality of numerical controllers; and
regard blocks that include the same command and the same type of address as the same program when counting the number of the input programs; and
the processor of the plurality of the numerical controllers is configured to:
in response to a user entering a character into the numerical controller, performs forward matching of the entered character based on the ranking information to determine and display a ranked command that includes the entered character, the ranked command associated with a program of the collected programs, and
in response to a user selecting and executing the ranked command, control the machining tool based on the associated program.

2. The machining system as set forth in claim 1, wherein the processor of the information processing device is further configured to check syntax of the programs collected and store only the programs whose syntax is correct.

3. The machining system as set forth in claim 1, wherein information regarding users having entered the programs is associated with the programs collected, and
the processor of the information processing device is further configured to weight the programs on the basis of the information regarding the users and carry out scoring of the programs with the weighting taken into account.

4. The machining system as set forth in claim 1, wherein information regarding the numerical controllers in which the programs are entered is associated with the programs collected, and
the processor of the information processing device is further configured to assign classifications to the programs on the basis of the information regarding the numerical controllers and create the ranking information for each of the classifications.

5. The machining system as set forth in claim 1, wherein information regarding machines controlled by the numerical controllers to which the programs are input is associated with the programs collected, and
the processor of the information processing device is further configured to assign classifications to the programs on the basis of the information regarding the machines and creates the ranking information for each of the classifications.

6. The machining system as set forth in claim 1, wherein the processor of the information processing device is further configured to store only the programs within a predetermined period defined prior to storing of the programs.

7. The machining system as set forth in claim 1, wherein the processor of the information processing device is further configured to carry out the counting of the programs within a predetermined period stored and carry out the scoring of the programs, the predetermined period being defined prior to the counting and the scoring of the programs.

* * * * *